DRIVE FOR TURNTABLE MECHANISM

Filed July 2, 1956

INVENTOR
CHARLES EISLER
BY
ATTORNEY

United States Patent Office 2,887,897
Patented May 26, 1959

2,887,897

DRIVE FOR TURNTABLE MECHANISM

Charles Eisler, South Orange, N.J.

Application July 2, 1956, Serial No. 595,387

1 Claim. (Cl. 74—436)

Figures 1, 2:
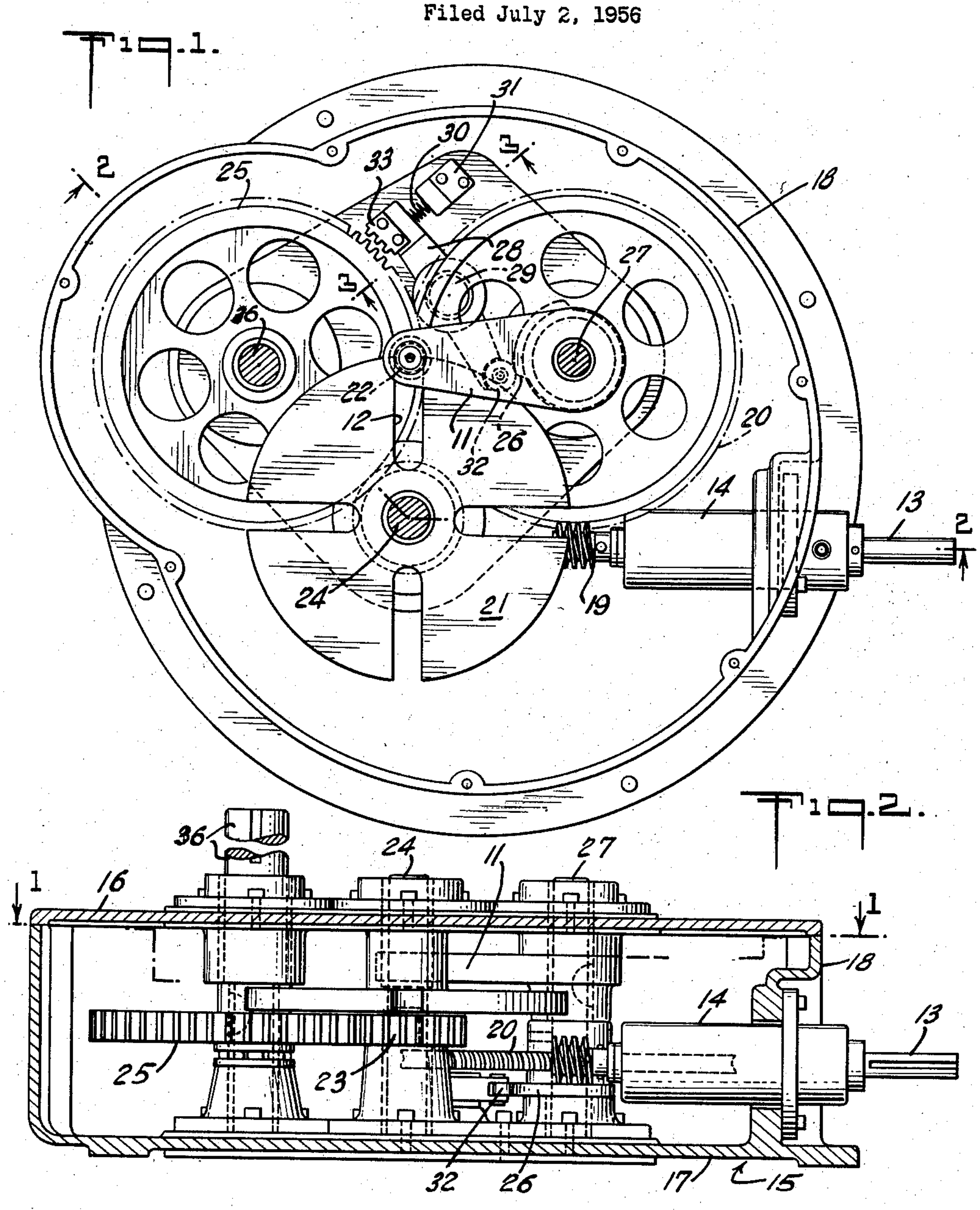

This invention relates to a drive mechanism providing intermittent controlled rotation responsive to continuous rotation of a drive shaft. The invention includes novel registration means for assuring the intermittent rotation for only such arcs or times as desired. The invention may be applied to mechanisms such as intermittent turntables, for example, used in industries for assembly, finishing or other operations. The invention provides positive cycles of rotation-stop-rotation, and prevents free rotation past each intended cycle of rotation. This end is achieved by the provision of novel means automatically and positively engaging a gear to which the output shaft is keyed, and holds the same against free rotation intermediate the cycles of intended rotation.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claim are to be considered within the scope and purview of the instant invention.

Figure 3:
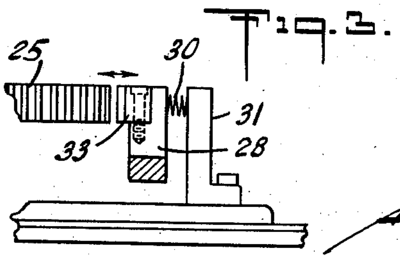

In the drawings:

Fig. 1 is a top plan view of a device embodying the invention, taken on line 1—1 of Fig. 2, Fig. 2 is a vertical, partly sectional elevational view taken on line 2—2 of Fig. 1, and Fig. 3 is a fragmentary, vertical sectional view taken on line 3—3 of Fig. 1.

As shown in the drawings, the device of this invention includes a mechanism for intermittently driving the output shaft 36 such as the means 11 and 12 hereinafter more particularly described on continuous rotation of drive shaft 13. Drive shaft 13 is suitably journalled, as, for example, in a bearing 14 secured to a support 15 (Fig. 2) which may be a plate or casing having top and bottom walls 16, 17 and a side wall 18. A drive member 19 such as a worm gear or the like is secured to or otherwise formed or disposed on the inner end of shaft 13 for meshing engagement with a first gear 20 journalled on the support 15. A Geneva disc 21 is journalled on support 15, and complementary means are provided on the first gear 20 and Geneva disc 21 to intermittently engage and to rotate said disc responsive to continuous rotation of the first gear 20. Said complementary means may comprise a driving arm 11 keyed to the drive shaft 27 of first gear 20 and slots 12 in the Geneva disc 21 to receive the roller 22 on driving arm 11. A pinion 23 is keyed to the shaft 24 for and abuts the Geneva disc 21 (Fig. 1) and meshes with a second gear 25 journalled on support 15 to drive second gear 25 in timed relation to the rotation of Geneva disc 21. The output shaft 36 may have a turntable keyed thereto or may be put to other uses.

It is found, in practice that there is a tendency of the second gear 25 to continue to rotate responsive to the natural law of inertia upon completion of its intended rotation cycle. Such free rotation upsets any program dependent upon accurate control, for example, a requirement that articles carried by the shaft 36 be exactly stationed at given points upon completion of each intended intermittent rotation of the Geneva disc 21.

Pursuant to the present invention, novel means are provided for assuring accurate control of the shaft 36 and any member keyed thereto by securing a cam element such as the cam ring 26 (Fig. 2) to the shaft 27 and in direct engagement with the first gear 20, and pivotally mounting a lever 28 (Fig. 1) intermediate its ends as at 29, adjacent and in alignment with the cam element 26. Means such as a spring 30 (engaging the lever 28 and bracket 31 on support plate 15) are provided to normally urge one end 32 (Fig. 2) of the lever 28 into engagement with the cam 26 to thereby urge the opposite end 33 of said lever (Fig. 1) against the second gear 25. The cam 26 is located on shaft 27 in predetermined relation to the position of the finger 11 on the shaft so that the second end 33 of the lever will be disengaged from the second gear 25 only when the complementary means 11, 12 rotate the Geneva disc 21 and will engage the second gear 25 to prevent rotation thereof (and of shaft 36) at the intervals between its intended cycles of rotation. The second end of the lever 33 may, as shown in Fig. 1, be formed as a gear segment for meshing with the second gear when urged thereagainst by the cam 26.

Having thus described my invention, what I claim as new and desire to secure by Letters Patent is:

A self-contained drive for a turntable mechanism comprising a support, first and second shafts journaled on said support, a Geneva disc keyed to the first shaft, a drive arm keyed to the second shaft, a roller on said arm engaging the disc to intermittently rotate the disc on continuous rotation of the drive arm, a pinion keyed to the first shaft, an output shaft journaled on the support, a gear keyed to said output shaft and meshing with the pinion and driven thereby whereby said gear will be intermittently rotated responsive to continuous rotation of the drive arm, a cam element keyed to the second shaft and having a high dwell, a lever pivotally mounted intermediate its ends on said support, and means normally urging one end of said lever into engagement with said cam, whereby, when the high dwell of said cam reaches said engaged end during operation, it urges the opposite end of the lever out of locking engagement with said gear, said cam being disposed in predetermined relation to said arm of the second shaft so that the lever will be held out of operative engagement with the gear only when said arm rotates the Geneva disc and will otherwise thus lock the gear and thereby prevent rotation thereof when said arm does not rotate the gear.

References Cited in the file of this patent

UNITED STATES PATENTS

| | | |
|---|---|---|
| 1,703,986 | Brown | Mar. 5, 1929 |
| 1,748,540 | Curtis | Feb. 25, 1930 |
| 1,985,477 | Wolf | Dec. 25, 1934 |
| 2,535,490 | Emerick | Dec. 26, 1950 |